United States Patent
Grann et al.

(10) Patent No.: US 7,272,323 B2
(45) Date of Patent: Sep. 18, 2007

(54) BI-DIRECTIONAL ELECTRICAL TO OPTICAL CONVERTER MODULE

(75) Inventors: Eric B. Grann, San Ramon, CA (US); Curtis A. Ray, Alamo, CA (US); Todd Whitaker, Pleasanton, CA (US); Michael J. Laha, Pleasanton, CA (US); Brian Peters, Pleasanton, CA (US)

(73) Assignee: Omron Network Products, LLC, Schaumburg, IL (US)

( * ) Notice: Subject to any disclaimer, the term of this patent is extended or adjusted under 35 U.S.C. 154(b) by 549 days.

(21) Appl. No.: 10/726,415

(22) Filed: Dec. 3, 2003

(65) Prior Publication Data

US 2004/0175181 A1    Sep. 9, 2004

Related U.S. Application Data

(60) Provisional application No. 60/430,956, filed on Dec. 4, 2002.

(51) Int. Cl.
*H04B 10/04* (2006.01)
*H04B 10/06* (2006.01)
*H04B 10/14* (2006.01)
*H04B 10/24* (2006.01)
*H04J 14/02* (2006.01)

(52) U.S. Cl. ............... 398/139; 398/5; 398/7; 398/79; 398/85; 398/91; 398/135; 398/200; 398/201; 398/214

(58) Field of Classification Search ......... 398/135–139
See application file for complete search history.

(56) References Cited

U.S. PATENT DOCUMENTS

| | | | | |
|---|---|---|---|---|
| 4,733,094 | A * | 3/1988 | Carpentier et al. | 250/551 |
| 5,796,899 | A * | 8/1998 | Butrie et al. | 385/92 |
| 6,157,477 | A * | 12/2000 | Robinson | 398/147 |
| 6,201,908 | B1 * | 3/2001 | Grann | 385/24 |
| 6,563,976 | B1 * | 5/2003 | Grann et al. | 385/24 |
| 6,870,976 | B2 * | 3/2005 | Chen et al. | 385/14 |
| 6,941,047 | B2 * | 9/2005 | Capewell et al. | 385/47 |
| 7,088,518 | B2 * | 8/2006 | Tatum et al. | 359/634 |

* cited by examiner

*Primary Examiner*—Kenneth Vanderpuye
*Assistant Examiner*—David S Kim
(74) *Attorney, Agent, or Firm*—Bruce H. Johnsonbaugh

(57) ABSTRACT

A bi-directional (BiDi) electrical to optical converter (transceiver) module is described that contains means for communicating in a full duplex fashion over one fiber. Furthermore, an automatic fail-over capability is included which allows redundancy to be build in to the transceiver. In one configuration, a BiDi transceiver module contains two lasers at different wavelengths and a means for establishing which wavelength to communicate with. An example of an application for the described invention is a storage area network application which requires redundant links and are currently bound by the number of fibers connecting to the front panels of switches.

2 Claims, 5 Drawing Sheets

BI-DIRECTIONAL ELECTRICAL TO OPTICAL CONVERTER MODULE

CROSS-REFERENCE TO RELATED APPLICATION

This application claims the benefit of and priority from U.S. provisional application Ser. No. 60/430,956 filed on Dec. 4, 2002.

BACKGROUND AND BRIEF SUMMARY OF INVENTION

In storage area networks (SAN) redundant and resilient connections between servers, switches, and storage devices are necessary in order to ensure that a single point of failure in the network will not disrupt data flow from or to any node. SAN switches are becoming increasingly denser with respect to the number of connections coming out of the front panel. A conundrum exists in increasing this density with conventional approaches. In order to avoid excess cost due to additional boxes, a new smaller optical connector must be proposed. However, customers already feel the existing connectors are too small to be able to handle confidently. The invention herein doubles the number of connections that will fit on the front panel of a switch without requiring the redesign of an optical connector. The existing optical connectors are used, yet the port density is doubled. Furthermore, each connection has a built in redundant detector and laser, the components expected to fail first in the system.

A second embodiment of the invention provides a bi-directional module for use in residential applications.

A bi-directional (BiDi) transceiver module is described that contains a means for sending and receiving data through only one fiber. The BiDi transceiver module can be constructed to be either soldered directly or pluggable (removable) to the host unit (i.e. switch box). One or more electrical signals are transferred between the host unit and the BiDi transceiver module. Additionally, one or more optical signals are both transmitted and received from the BiDi transceiver module over an optical media (i.e. simplex multimode fiber) to another host unit. Two or more lasers are used along with one or more detectors. A negotiation process is used between two transceivers to determine which wavelength will be used by which transceiver.

A primary object of the invention is to provide a BiDi transceiver module capable of simultaneously sending and receiving data through a single fiber.

A further object is to provide a transceiver module for use in storage area networks which utilizes existing optical connectors and which doubles the port density.

Another object is to provide a BiDi module for use in residential applications.

Other objects and advantages of the invention will become apparent from the following detailed description and drawings wherein:

DETAILED DESCRIPTION OF THE DRAWINGS

Figure 1:
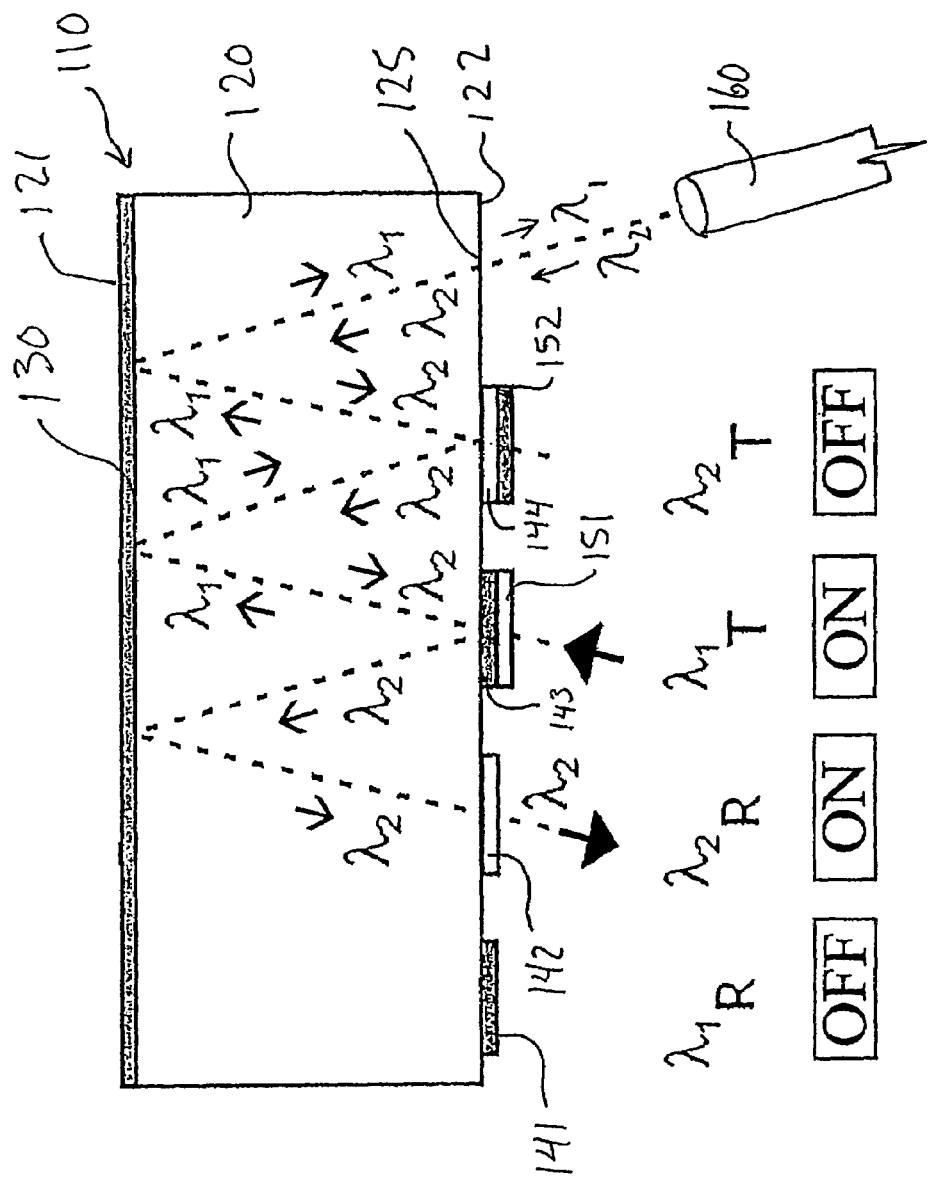
FIG. 1 is a schematic representation of a BiDi transceiver having two lasers and two detectors, wherein the first laser $T_1$ and second detector $R_2$ are simultaneously transmitting and receiving and wherein the second laser $T_2$ and first receiver $R_1$ are turned off.
Figure 2:
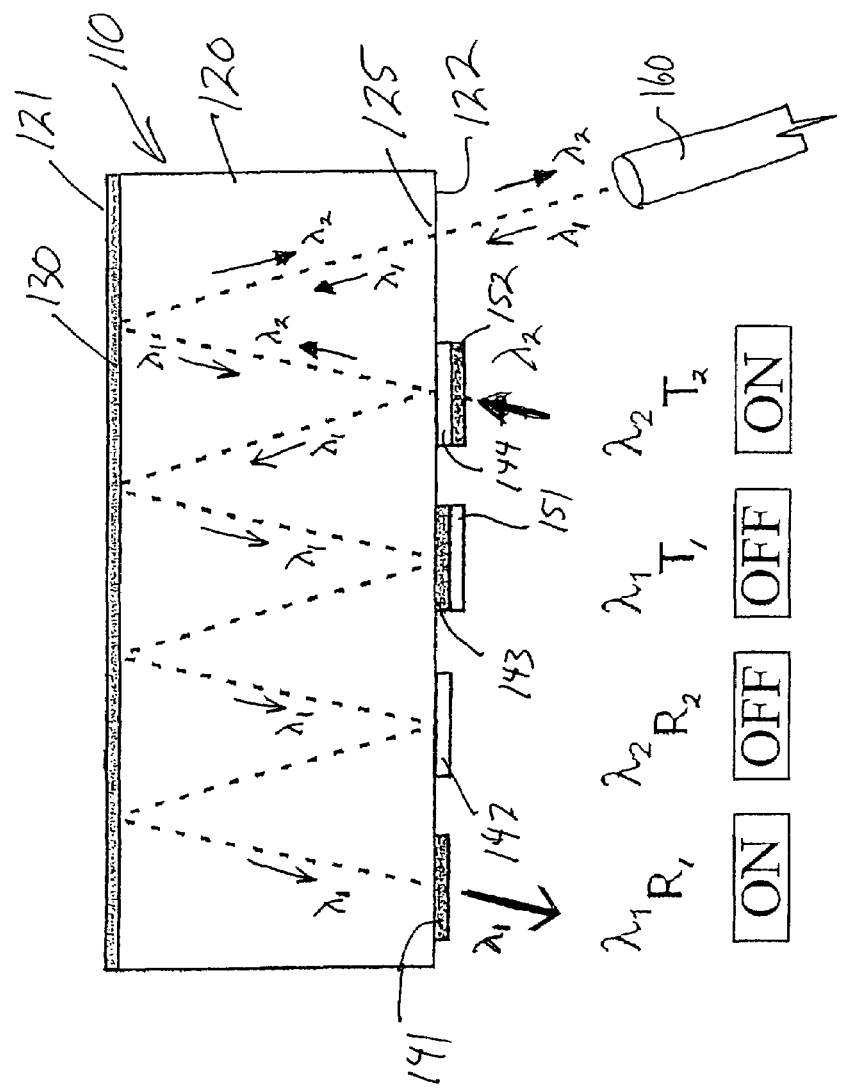
FIG. 2 is a schematic representation of the BiDi transceiver of FIG. 1 wherein second laser transmitter $T_2$ and receiver $R_2$ are in the on position and wherein the first laser $T_1$ and second receiver $R_2$ are in the off position.

FIGS. 1 and 2 illustrate a bi-directional transceiver shown generally as 110. Transceiver 110 includes an optical block 120 having a flat upper surface 121 and a flat lower surface 122. A reflective coating 130 is carried by the upper surface of optical block 120. A plurality of filters 141, 142, 143 and 144 are carried on the flat lower surface 122 of optical block 120. Filters 141-144 are adapted to filter different wavelengths. In the embodiment shown in FIGS. 1 and 2, filters 142 and 144 are designed to transmit light of wavelength $\lambda_2$ and filters 141 and 143 are designed to transmit light having wavelength $\lambda_1$.

Two beamsplitters 151 and 152 are attached to filters 143 and 144.

As shown in FIG. 1, a first transmitting laser $T_1$ transmitting an output beam with wavelength $\lambda_1$ is turned on and photodetector $R_2$ is turned on. In the configuration shown in FIG. 1, a second transmitting laser $T_2$ having an output beam of wavelength $\lambda_2$ is turned off and a first photodetector $R_1$ is turned off. The output beam of laser $T_1$ passes through beamsplitter 151, reflects off reflective surface 130, exits the optical block 120 at point 125 as shown by the arrows transmitting $\lambda_1$ light through a zigzag path in optical block 120 and outwardly to a single fiber optic cable 160. Simultaneously, transceiver 110 is receiving on the same zigzag optical pathway an input signal having wavelength $\lambda_2$ which enters optical block 120 at point 125 from cable 160. A portion of the incoming beam of wavelength $\lambda_2$ enters the splitter 152 and is essentially lost. The remainder of the beam continues the zigzag path shown by dotted lines and exits through filter 142 and impacts second photodetector $R_2$. The transceiver 110 is simultaneously transmitting a single channel and receiving a single channel through a single fiber optic cable 160.

FIG. 2 illustrates the redundancy aspect of optical transceiver 110 shown in FIG. 1 wherein the first transmitting laser $T_1$ is now turned off (if, for example, laser $T_1$ failed) and the second photodetector $R_2$ is turned off. In the configuration shown in FIG. 2, the second transmitting laser $T_2$ is turned on and transmits an output beam of wavelength $\lambda_2$. The first photodetector $R_1$ is turned on and receives an in-coming channel having wavelength $\lambda_1$. The output of transmitting laser $T_2$ passes through filter 144 and beamsplitter 152, is reflected off the reflectance layer 130 on the upper surface 121 of block 120 and exits block 120 at exit point 125 and passes into a single fiber optic cable 160. Simultaneously, the transceiver 110 is receiving a single channel of wavelength $\lambda_1$ that is transmitted through single fiber optic cable 160, passes through point 125 in the lower surface 122 of block 120 and is reflected along the zigzag path as shown by the arrows in FIG. 2 carrying the $\lambda_1$ input signal. As the $\lambda_1$ signal impacts splitter 151 half of the $\lambda_1$ signal is lost. The remaining portion of the signal continues down the zigzag pathway and exits through filter 141 and impacts the first photodetector $R_1$.

It is understood that the transceiver 110 shown in its simplest form in FIGS. 1 and 2 may be extended to the general case in which the transceiver is capable of transmitting n channels and receiving m channels through a single fiber optic cable. The general case is illustrated schematically in FIG. 3 in which m transmitting lasers are illustrated each having a separate wavelength $\lambda_1$ through $\lambda_n$ wherein each of the n lasers is optically aligned with one of the n beamsplitters. Similarly, a plurality of m photodetectors $R_1$ through $R_m$ is optically aligned with one of the filters 241–240+m to separately filter said m different wavelengths. It is also possible to reduce the number of detectors and receive all signals on one detector. Reflections become an issue and both transmitted and reflected power levels must be strictly maintained to avoid cross talk issues.

Figure 4:
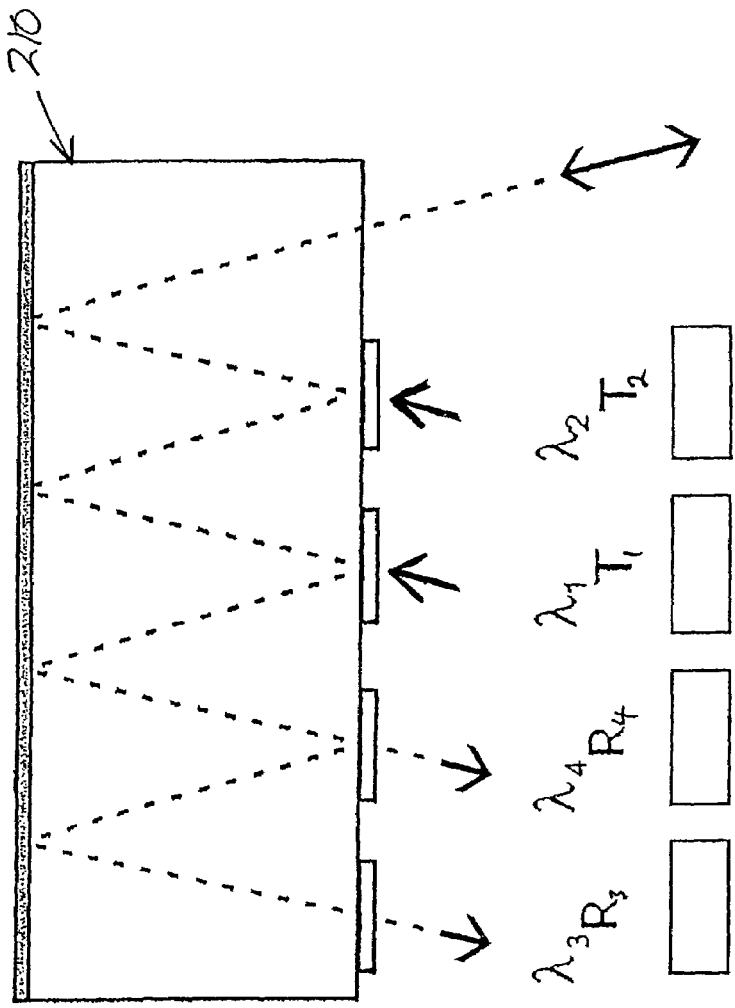
FIG. 4 is a schematic representation of the BiDi receiver module of FIGS. 1 and 2 used in conjunction with an optical sub-assembly shown and described in U.S. Pat. No. 6,201,908.

FIG. 4 illustrates an optical block 20 which may be utilized in the present invention. The optical block 20 and related optics are shown and described in detail in U.S. Pat. No. 6,201,908, incorporated herein by reference. The '908 patent illustrates in detail how the optical block 20 is preferably coupled to a fiber optical receptacle through a collimating lens. Those optics are the preferred optics for use in conjunction with the present invention, although other optical pathways could be utilized. A detailed repetition of the description contained in the '908 patent is not made here in the interest of brevity.

Figure 3:
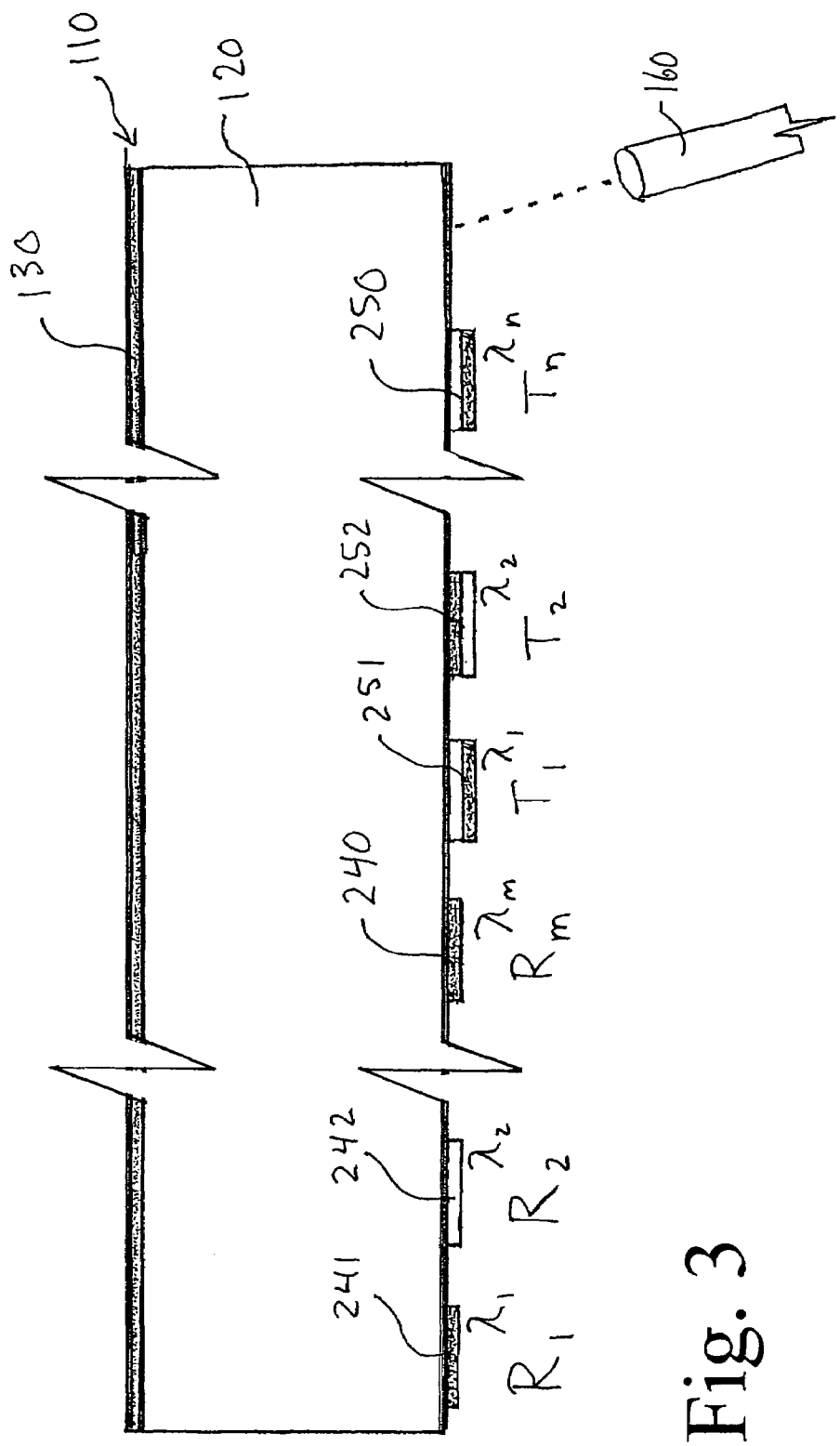
FIG. 3 is a schematic representation of an embodiment showing the general case of n transmitting lasers and m receivers.
Figure 5:
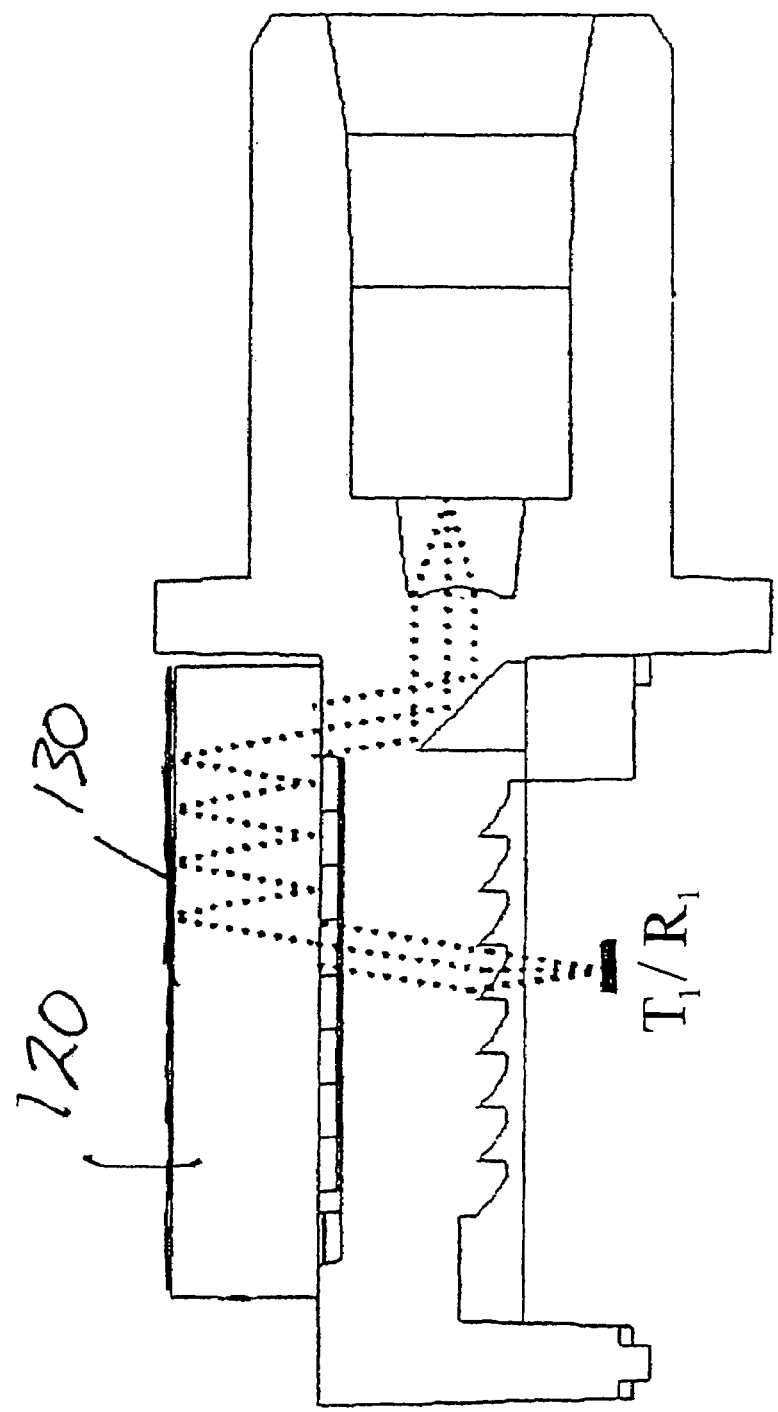
FIG. 5 is a schematic representation of an alternate embodiment of the invention adapted for use in residential applications.

FIG. 5 illustrates a second embodiment of the invention adapted for use in residential facilities. The primary difference in this embodiment from that shown in FIGS. 1-3 is that no beamsplitters are utilized. In the embodiment shown in FIG. 5, the two transmitting lasers $T_1$ and $T_2$ transmit with output beams having wavelengths $\lambda_1$ and $\lambda_2$ and the receiving photodetectors $R_3$ and $R_4$ receive signals transmitted into transceiver 210 at different wavelengths from the outputting lasers, i.e., at wavelengths $\lambda_3$ and $\lambda_4$. The transmitting of two channels and receiving of two channels occurs simultaneously. By utilizing different wavelengths, the use of 50-50 beamsplitters is avoided and costs are kept to the absolute minimum.

The foregoing description of the invention has been presented for purposes of illustration and description and is not intended to be exhaustive or to limit the invention to the precise form disclosed. Modifications and variations of the above are possible in light of the above teaching. These particular embodiments were chosen and described to best explain the principles of the invention and its practical application, thereby enabling others skilled in the art to best use the invention in various embodiments and with various modifications suited to the particular use contemplated. The scope of the invention is to be defined by the following claims.

What is claimed is:

1. A bi-directional optical transceiver for either transmitting a first channel having wavelength $\lambda_1$ and simultaneously receiving a second channel having a different wavelength $\lambda_2$, or transmitting said second channel having wavelength $\lambda_2$ and simultaneously receiving said first channel having wavelength $\lambda_1$ through a single fiber optic cable comprising:

an optical block having a flat upper surface and a flat lower surface, a reflective coating carried by said upper surface of said optical block, first and second filters carried on said flat lower surface of said optical block, said filters adapted to separately filter said different wavelengths $\lambda_1$ and $\lambda_2$, first and second photodetectors wherein each of said first and second photodetectors is optically aligned with said first and second filters, respectively, to receive one of said first and second channels through one of said filters, third and fourth filters carried on said flat lower surface of said optical block, said filters adapted to separately filter said wavelengths $\lambda_1$ and $\lambda_2$, first and second beam splitters carried by said third and fourth filters, respectively, and first and second transmitting lasers, said first transmitting laser having an output wavelength $\lambda_1$ and second transmitting laser having an output wavelength $\lambda_2$, wherein each of said first and second lasers is optically aligned with one of said first and second beam splitters, and one of said third and fourth filters, respectively, wherein whenever said first transmitting laser is operating at first wavelength $\lambda_1$, said second transmitting laser is turned off, and said second photodetector is receiving said second channel of wavelength $\lambda_2$ and said first photodetector is turned off, and wherein whenever said second transmitting laser is operating at said second wavelength $\lambda_2$ said first transmitting laser is turned off, and said first photodetector is receiving said first channel of wavelength $\lambda_1$ and said second photodetector is turned off.

2. The apparatus of claim 1, further comprising means for turning on said second transmitting laser and said first photodetector when either said first transmitting laser or said second photodetector fails, thereby creating a built-in redundancy of the transceiver.

\* \* \* \* \*